United States Patent [19]
Ball et al.

[11] Patent Number: 6,085,273
[45] Date of Patent: Jul. 4, 2000

[54] MULTI-PROCESSOR COMPUTER SYSTEM HAVING MEMORY SPACE ACCESSIBLE TO MULTIPLE PROCESSORS

[75] Inventors: Alan E. Ball; David J. White; John D. Haughton, all of West Sussex, United Kingdom

[73] Assignee: Thomson Training & Simulation Limited, Crawley, United Kingdom

[21] Appl. No.: 08/953,790

[22] Filed: Oct. 9, 1997

[30]    Foreign Application Priority Data

Oct. 1, 1997 [GB] United Kingdom ............... 9720736

[51] Int. Cl.⁷ ...................................................... G06F 13/38
[52] U.S. Cl. ............................................................... 710/129
[58] Field of Search ..................... 395/309, 308, 395/651–653, 284, 830; 711/170–173, 147–153; 710/129, 128, 104, 10; 713/1, 2, 100

[56]    References Cited

U.S. PATENT DOCUMENTS

| | | | |
|---|---|---|---|
| 4,783,731 | 11/1988 | Miyazaki et al. | 711/148 |
| 4,827,406 | 5/1989 | Bischoff et al. | 711/153 |
| 4,866,597 | 9/1989 | Kinoshita | 395/200.44 |
| 5,418,970 | 5/1995 | Gifford | 395/800.2 |
| 5,568,619 | 10/1996 | Blackledge et al. | 395/281 |
| 5,613,068 | 3/1997 | Gregg et al. | 395/200.46 |
| 5,752,010 | 5/1998 | Herbert | 395/509 |
| 5,790,814 | 8/1998 | Gan et al. | 395/308 |
| 5,802,541 | 9/1998 | Reed | 711/1 |
| 5,835,738 | 11/1998 | Blackledge, Jr. et al. | 395/307 |
| 5,838,932 | 11/1998 | Alzien | 395/308 |

OTHER PUBLICATIONS

MCP106UMAD/AD Sep. 1997 MPC106 Revision 4.0 Supplement and User's Manual Errata.
MPC106 Aug. 1996 PCI Bridge/Memory Controller Technical Summary.
MPC106UM/AP Sep. 1997 MPC106 User's Manual.

*Primary Examiner*—Paul R. Myers
*Attorney, Agent, or Firm*—Nixon & Vanderhye P.C.

[57]    ABSTRACT

A multi-processor computer system comprises one or more CPUs (1) connected to a host computer (2) via a common PCI bus system backplane (3). The host computer (2) comprises a host microprocessor and associated memory unit and each CPU comprises a local microprocessor (5) having a local bus (15), an associated local memory unit (6), and a PCI connector (9) connected to the PCI backplane. Each CPU (1) further comprises a bridge (7) having at least two decoders installed between the CPU local bus (15) and the PCI connector (9) and providing an interface between the local microprocessor (5) and the associated local memory unit (6). A first decoder (A) of each bridge (7) is programmed to a first address range for access to the respective local memory unit (6) by the associated local processor (5), and a second decoder (B) of each bridge (7) is programmed to a second address range for access to the same physical memory of the memory unit (6) by another microprocessor (5) of the system. The same first address range and different second address ranges are allocated to each associated memory (6). Each microprocessor (5) of the computer system can access the entire PCI memory space comprising the memory units associated with all microprocessors (1) of the system.

5 Claims, 4 Drawing Sheets

MULTI-PROCESSOR COMPUTER SYSTEM HAVING MEMORY SPACE ACCESSIBLE TO MULTIPLE PROCESSORS

BACKGROUND OF THE INVENTION

1. Technical Field

The present invention relates to a multi-processor computer system.

2. Description of Related Art

Multi-processor computer systems which provide increased processing power through parallel processing operation are known. Such systems are used in a wide variety of applications such as, for example, flight simulators wherein simulator functions are allocated to different processors. For instance, one known flight simulator system comprises a number of commercial "off-the-shelf" single board computer (SBC) real-time TARGETS each based on a Motorola PowerPC microprocessor, connected to a Data Processing HOST comprising of another Motorola PowerPC SBC. In this system, the HOST and TARGETS are interconnected by a VME 32-bit bus system which is one of a number of known multi-processor bus systems. PowerPC CPUs are used because commercial avionics simulation code is big-endian and thus cannot be run on an Intel x86 processor (or clone).

In more detail, each single board computer comprises a PowerPC microprocessor with associated non-volatile programme memory, system memory (DRAM), and level 2 cache memory, interconnected by a standard PowerPC local bus. A bridge is provided from the PowerPC local bus to an on-board peripheral expansion bus, complying with the Peripheral Component Interconnect (PCI) bus standard. Control of memory systems on the PowerPC local bus as well as the bridge between PowerPC local bus and PCI bus is provided by a Motorola MPC105/6 PCI Bridge/Memory Controller. Connected to the PCI bus are ethernet and graphics adapters and an SCSI-2 interface (an industry standard Small Computer System Interface providing for the connection of a variety of peripheral devices). An ISA (Industry Standard Architecture) bus is connected to the PCI bus via a PCI-ISA bridge and provides facilities for the interconnection of I/O devices such as mouse, keyboard, floppy drives and serial ports. A further bridge provides connection from the PCI bus to the off-board (backplane) VME bus for communication between SBC's.

Full technical specifications are readily available for all the above mentioned components and bus architectures.

Whilst this known flight simulator system has the benefit that it is constructed from readily available commercial-off-the-shelf components, it does have a number of disadvantages. Limitations to the clock rate and bandwidth of the VME bus are such that inter-processor communication via the VME bus is significantly slower than the intra-processor performance and thus the VME bus presents a communications bottle-neck. In addition, VME based systems present scalability problems since the bus may be saturated by a relatively small number of processors. One means of increasing the total number of available interconnected processors is to employ multiple VME sub-systems, together with some means of communicating between sub-systems, typically some form of reflective memory. Such a system can be designed in such a way that the majority of inter-processor communication remains within a sub-system, and has no impact on other sub-systems, whilst the reflective memory system provides communication between sub-systems when required. This approach however is relatively expensive in terms of the additional VME packaging hardware, support hardware and the reflective memory system required.

SUMMARY OF THE INVENTION

It is an object of the present invention to provide a multi-processor computer system which obviates or mitigates the above disadvantages.

The present invention provides a multi-processor computer system, comprising one or more CPUs connected to a host computer via a common PCI bus system backplane, the host computer comprising a host microprocessor and associated memory unit, and the or each CPU comprising a local microprocessor having a local bus, an associated local memory unit, a PCI connector connected to the PCI back plane, and a bridge having at least two decoders installed between the CPU local bus and the PCI connector and providing an interface between the local microprocessor and the associated local memory unit, wherein a first decoder of the or each bridge is programmed to a first address range for access to the respective local memory unit by the associated local processor, and a second decoder of the or each bridge is programmed to a second address range for access to the same physical memory of the memory unit by another microprocessor of the system, the same first address range and different second address ranges being allocated to each associated memory, whereby each microprocessor of the computer system can access the entire PCI memory space comprising the memory units associated with all microprocessors of the system.

Preferably, the or each bridge comprises a PCI bridge interfacing the local processor bus and the associated local memory, and a PCI-PCI bridge installed between the PCI bridge and the PCI connector.

The or each local microprocessor comprises a PowerPC, and the PCI bridge comprises a Motorola PCI 106 bridge.

Means may be provided for programming said second decoder of the or each bridge with the required second address range by first disabling the decode function of the respective MPC 106 bridge, then writing an appropriate start address to the respective second decoder from the host computer whilst the decode is disabled, thereby causing the MPC 106 bridge to treat the memory write cycle as a memory select error and capture the memory address and enable the associated PowerPC processor to read the captured address and program it into the second decoder. Access to the local memory of a CPU by another processor of the system may be enabled by the processor requiring access asserting signal "ISA master" on the MPC 106 bridge of that CPU and programming the associated PCI-PCI bridge to the same address range as the second decoder of the respective MPC 106 bridge so that only memory cycles falling within the address range of a particular MPC 106 bridge are passed to that bridge by the associated PCI-PCI bridge.

The PCI system architecture provides advantages over the VME bus based prior art system, particularly in that it has a greater bandwidth and this provides higher inter-processor communication speed. For instance, a 32 bit PCI bus operating at 33 MHz can transfer data at a rate of 132 Mbytes/Sec. Furthermore, 64 bit extensions (with operation speeds of 66 MHz) are now available.

The present invention may be implemented using only commercially available components in order to minimise production costs. No such components are presently available which are specifically designed for interconnecting processors via a PCI bus, and in particular for interconnecting PowerPC based CPUs to a host computer system based on the x86 family of microprocessors, but the present invention can be implemented using conventional components in a non-conventional manner. In particular, the invention makes it possible to provide a system architecture and configuration software which enables PowerPC processors to be linked to a host computer via a common PCI bus backplane in such a way that all processors in the system have access to the entire PCI memory space (i.e. individual PowerPC processors have access to both their own local memory and to the local memories associated with all the other processors in the system).

BRIEF DESCRIPTION OF THE DRAWINGS

A specific embodiment of the present invention will now be described, by way of example only, with reference to the accompanying drawings, in which.

DETAILED DESCRIPTION

Figure 1:
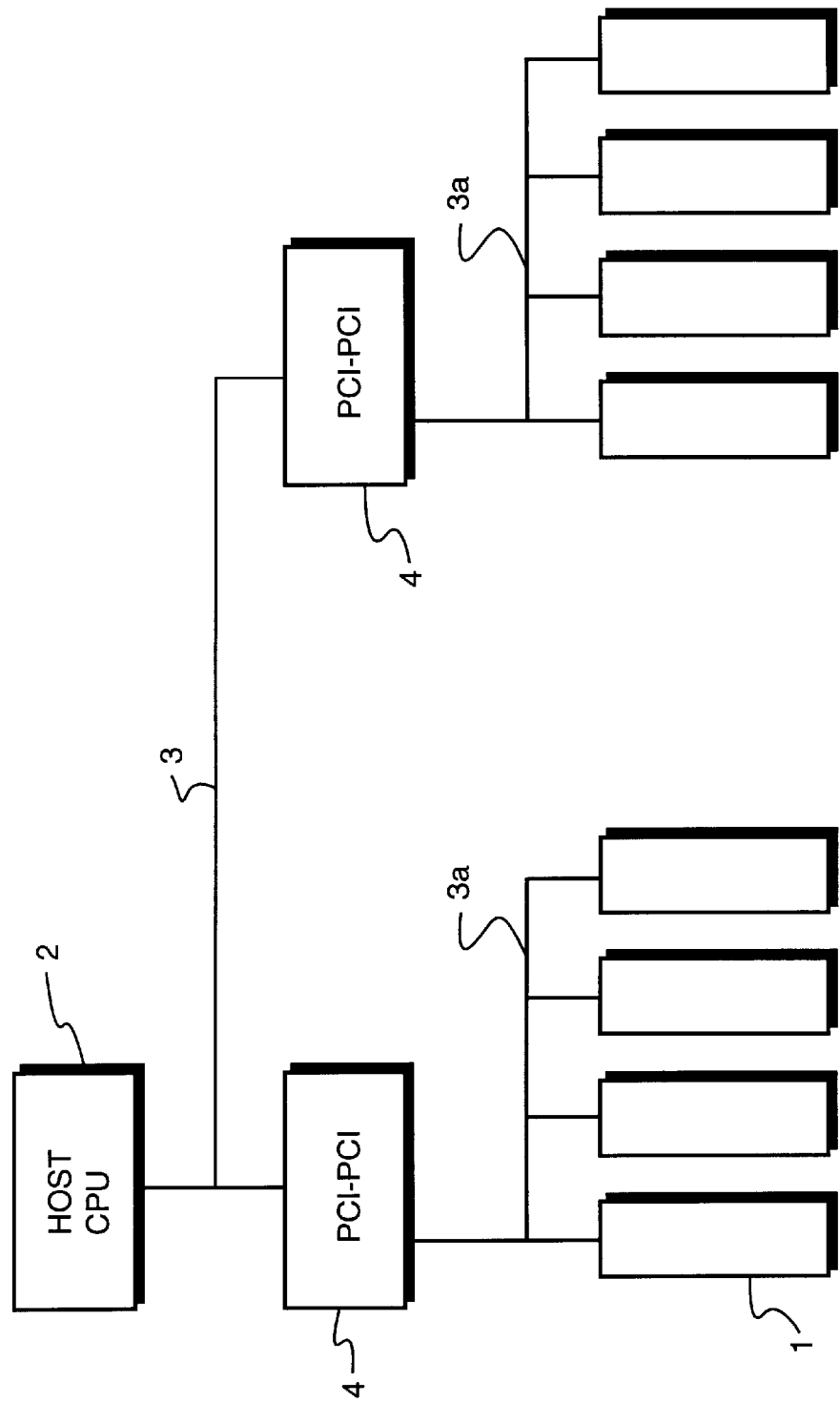
FIG.1 is a schematic illustration of a multi-processor computer system in accordance with the present invention.

Referring to FIG. 1, the illustrated computer system according to the present invention is based on PCI system architecture and comprises eight single board PowerPC microprocessor based CPUs 1 connected to an Intel Pentium microprocessor-based host computer 2 on a common PCI bus backplane 3. In the illustrated example, the host computer 2 is a conventional PC which has at least eight PCI expansion slots. PCI expansion slots are arranged in groups of four, each group connected to the host, and to the other group, via PCI-PCI bridges, which are an integral part of the backplane 3. Each group of four CPU's 1 can thus communicate amongst themselves, or with the host computer 2, without impacting the other group.

It will be readily appreciated that since the topology of the PCI system is a bridge architecture, additional PowerPC CPUs 1 could be installed if further PCI expansion slots were available, without significantly impacting communication between CPU's within a group. It will also be appreciated that fewer than eight PowerPC CPUs may be installed, and indeed only a single PowerPC CPU may be installed. Versatility and scaleability provided by the PCI bridge based architecture is one of a number of advantages of the present invention over existing VME based systems.

Figure 2:
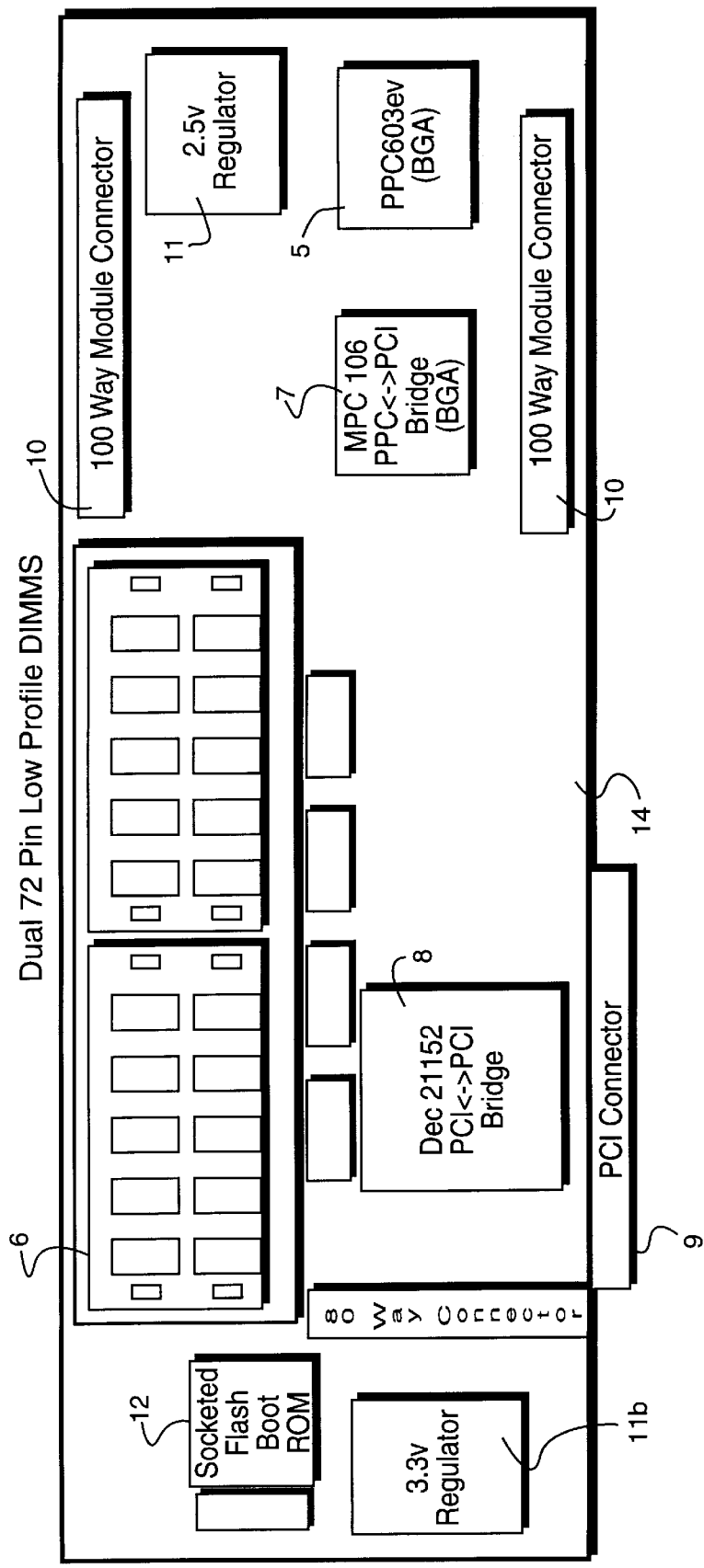
FIG. 2 is a schematic illustration of a single board CPU of the computer system illustrated in FIG. 1.

Referring now to FIG. 2 (which illustrates the major components of a single CPU 1) each PowerPC CPU 1 comprises a PowerPC processor 5 (in the example this is a Motorola PowerPC 603 ev running at 200 MHZ but other members of the 60x microprocessor family may also be used), a memory unit 6 (comprising dual 72 pin Small Outline DIMMS), a Motorola MPC 106 bridge 7, a PCI-PCI bridge 8, a PCI connector 9, two 100 way module connectors 10, a 2.5 volt regulator 11a, a 3.3 volt regulator 11b, and socketed flash boot ROM 12. These components are all integrated on a standard baseboard 14 for connection to the PCI slots of the host computer 2.

Figure 3:
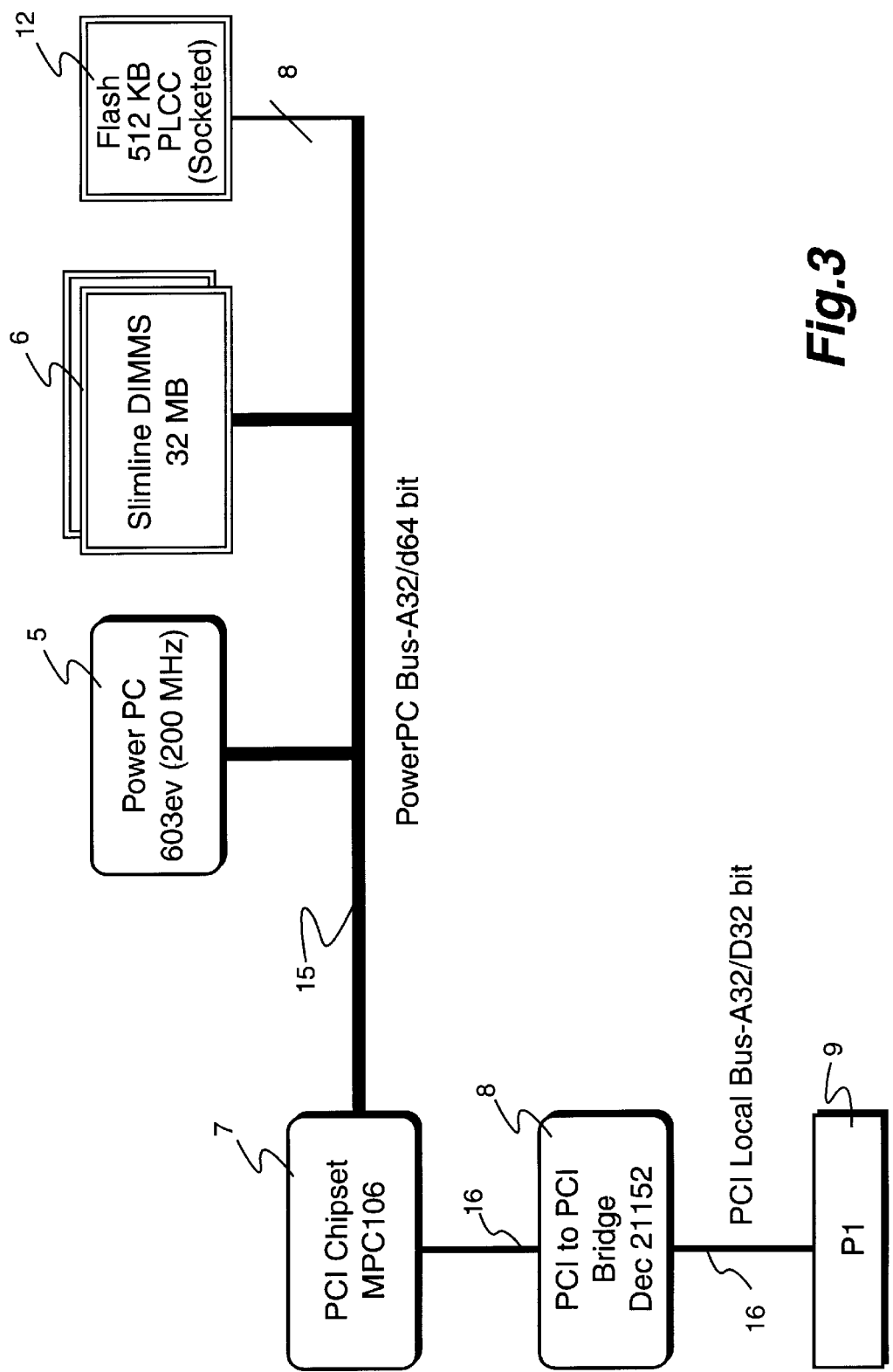
FIG. 3 is a schematic illustration of the architecture of the single board CPU illustrated in FIG. 2.

The basic architecture of each CPU board is schematically illustrated in FIG.3 from which it can be seen that the PowerPC microprocessor 5 is installed on a local PowerPC bus 15 (A32/D64 bit). A Motorola MPC106 bridge/Memory Controller 7 provides control for the memory unit 6 and flash memory unit 12 and also provides a bridge between the PowerPC bus 15 and the on-board PCI bus 16. A PCI-PCI bridge 8 provides a further bridge between PCI bus 15 and the PCI backplane of the host computer via the PCI connector 9.

It will be seen immediately that the single CPU board comprises readily available commercial off the shelf components (full technical specifications of which are readily available) and moreover comprises only a minimum number of components thereby reducing cost. For instance, the board does not comprise any PCI adapters (such as graphics, ethernet and SCSI adapters) or an ISA bus and associated adapters which are not required to be provided by the CPUs 1 because they will be provided by the host computer 2. This is a further advantage of the present invention over prior art systems mentioned above.

The system architecture and configuration software are designed so that each PowerPC CPU 1 has full access to the entire PCI memory space comprising the memory of every CPU 1 (via the PCI bus) as well as to its own local memory. Achieving this using only commercially available components not specifically designed for this purpose is a problem addressed by the present invention. The invention solves this problem by using each MPC 106 bridge chip in conjunction with a PCI-PCI bridge in a non-conventional way using suitably designed configuration software. This is described in more detail below.

The MPC 106 bridge chip 7 comprises the following main features: a PowerPC processor interface, a memory interface, a PCI interface, and configuration registers including four address registers. The MPC106 also comprises additional features such as a level two cache memory interface and error/interrupt control and power management functions. The PCI interface (which connects the PowerPC processor and local memory buses to the PCI bus) is compliant with the PCI local bus specification, revision 2.1 and supports access to all PCI address spaces. The interface presents only one external load to the PCI bus. The PCI interface can function as both a master and a target device. As a master the MPC 106 supports read and write operations to the PCI memory space, the PCI I/O space, and the PCI configuration space. As a target the MPC 106 supports read and write operations to system memory (in this case the associated local RAM 6). In addition, Mode selectable big-endian to little-endian conversion is supplied at the PCI interface.

Figure 4:
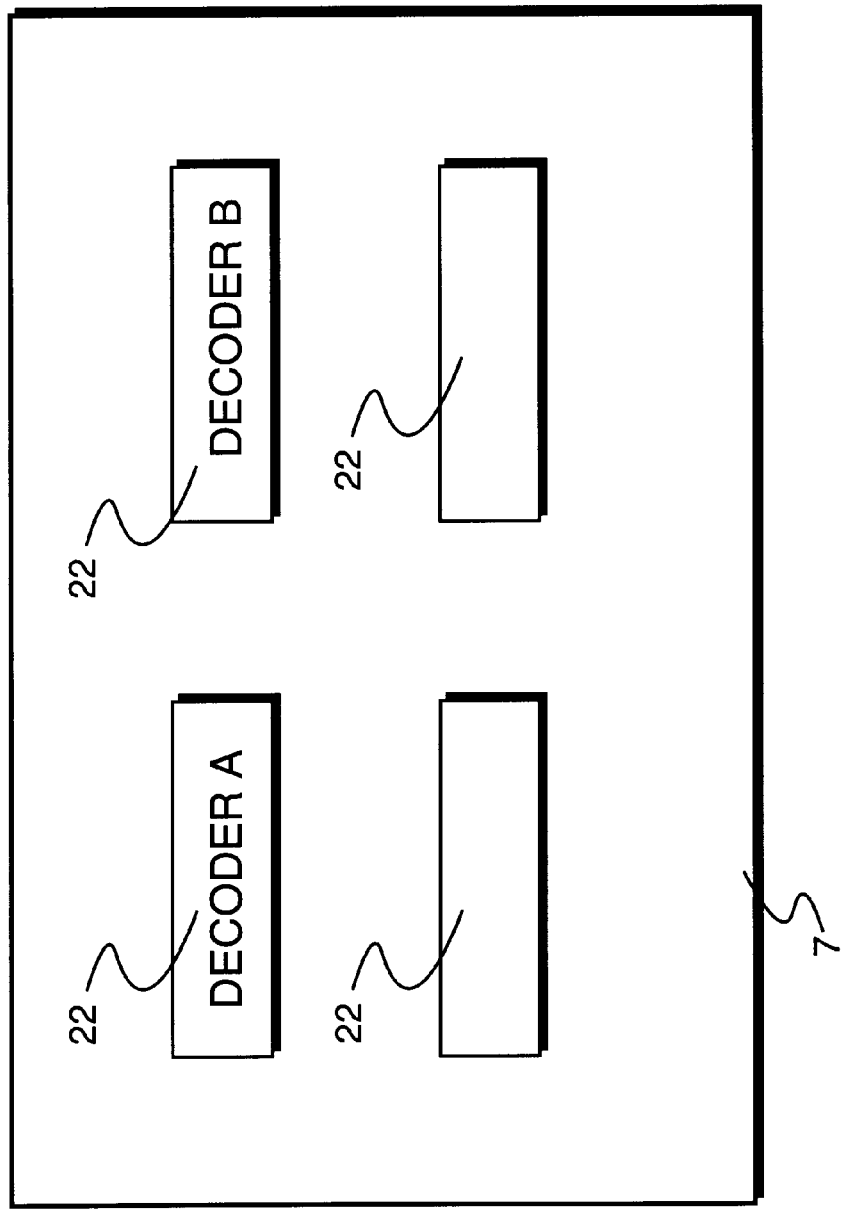
FIG. 4 schematically illustrates the decoders of the MPC 106 PCI bridge illustrated in FIG. 2.

In the system according to the present invention the local memory 6 of each CPU 1 can be accessed by the respective local PowerPC processor 5 and by any off board processor which may be either the host processor or the local processor of one or more additional CPUs 1 installed in the PCI backplane. To enable this, the present invention makes use of two of the four decoders 22 provided on the MPC 106 PCI bridge 7 (see FIG. 4). A first decoder, which will be referred to as "decoder A", on each bridge is programmed to provide the respective PowerPC processor 5 access to its associated local memory 6. This decoder is programmed to the same predetermined start address on each CPU board 1 so that software code (which is loaded from the host computer during configuration and initialisation) does not have to be specific to any particular board (i.e. would not need to be relocated depending on which board it is run) but rather can be run on any CPU 1. However, since each decoder A is programmed to the same address range on each CPU 1, these decoders cannot be used for access to respective local memory units 6 from an off board CPU 1 via the PCI backplane. Accordingly, a second decoder, which will be referred to as "decoder B", is programmed with a different address range for each CPU 1 which is mapped in the PCI address space by the host computer 2. The outputs from both decoders A and B of each CPU board 1 are combined external of the respective MPC 106 bridge 7 so that the same physical memory unit 6 can be enabled from either of the two different address ranges, i.e. for the local processor access decoder A is used and for an external CPU access decoder B is used.

However, although the MPC 106 can operate as a target for PCI memory and I/O transactions, it is essentially designed as a PCI host bridge i.e. to be the bridge between a PowerPC host processor and the PCI bus, and not to be one of a number of PCI agents under a separate controller, which in this case is the host processor 2 and associated PCI chipset. This presents two specific problems: firstly the MPC 106 is not designed to enable the configuration registers, including address decoder B, to be programmed directly from the PCI interface; and secondly, even with the correct address range programmed into decoder B, the MPC 106 does not directly allow PCI memory space cycles generated from any processor other than the respective local processor 5 to be decoded as memory space cycles on the local board.

The first problem is solved by the configuration software (run by the host computer 2) which is designed to first identify the presence of individual CPUs 1 and to determine the size of the local memory of each CPU, to then disable the decoders of the MPC106 bridge of each identified CPU 1, and then to deliberately write to the start of the required decoder B the address range of each CPU 1 whilst the decoder is still disabled. (Each CPU 1 identified is given a different decoder B address range which is mapped to the total PCI memory space.) The MPC 106 regards this write operation as a memory select error which causes it to capture the address. This address is then read by the local processor boot firmware running on the local PowerPC which can then program decoder B as required. In other words, the host computer 2 is able to communicate the required base address to the decoder B of each CPU 1 before any memory decoder has been enabled, which causes the local PowerPCs on respective CPU boards 1 to program the local B decoders as required when booting up from firmware.

The solution to the second problem is two-fold. Firstly, when access to system memory 6 is required from another CPU, signal "ISA master" is asserted on the MPC 106 bridge 7 of the target CPU. This has the effect of forcing the MPC 106 to recognise all PCI memory space cycles. However, although this enables each bridge 7 to accept and decode memory space cycles generated by processors other than its local processor 5 via the PCI backplane this would have the effect of enabling each bridge 7 to latch all address cycles whether or not intended for that particular CPU 1. This secondary problem is solved by the PCI-PCI bridge 8 which is installed on each CPU board 1 between the respective MPC 106 bridge 7 and the backplane PCI interface connector 9. That is, the configuration software programs the PCI-PCI bridge 8 installed on each CPU board 1 with the same address range as that programmed into the respective address decoder B. Thus, only those memory cycles falling within the range of a particular PCI-PCI bridge, and thus the range of associated decoder B, are passed by the respective PCI-PCI bridge 8 to the MPC 106 bridge 7.

Since both the PCI-PCI bridges and associated decoder B address ranges are programmed under host configuration software control during board initialisation, they can be positioned anywhere in the PCI memory space for compatibility with other installed devices. Individual CPU board address ranges are mapped to the global PCI address space so that read/write cycles initiated by one board are addressed to the correct physical memory location.

In summary, the present invention provides a system architecture which allows very low cost CPU boards to be constructed exclusively through the use of standard components, the processing power of which can be readily scaled by adding additional boards (taking advantage of PCI architecture scalability ) whilst retaining 100% memory access between CPUs.

What is claimed is:

1. A multi-processor computer system, comprising one or more CPUs connected to a host computer via a common PCI bus system backplane, the host computer comprising a host microprocessor and associated memory unit, and the or each CPU comprising a local microprocessor having a local bus, an associated local memory unit, a PCI connector connected to the PCI backplane, and a bridge having at least two decoders installed between the CPU local bus and the PCI connector and providing an interface between the local microprocessor and the associated local memory unit, wherein a first decoder of the or each bridge is programmed to a first address range for access to the respective local memory unit by the associated local processor, and a second decoder of the or each bridge is programmed to a second address range for access to the same physical memory of the memory unit by another microprocessor of the system, the same first address range and different second address ranges being allocated to each associated memory, whereby each microprocessor of the computer system can access the entire PCI memory space comprising the memory units associated with all microprocessors of the system.

2. A computer system according to claim 1, wherein the or each bridge comprises a PCI bridge interfacing the local processor bus and the associated local memory, and a PCI-PCI bridge installed between the PCI bridge and the PCI connector.

3. A computer system according to claim 2, wherein the or each local microprocessor comprises a PowerPC, and the PCI bridge comprises a Motorola PCI 106 bridge.

4. A computer system according to claim 3, comprising means for programming said second decoder of the or each bridge with the required second address range by first disabling the decode function of the respective MPC 106 bridge, then writing an appropriate start address to the respective second decoder from the host computer whilst the decode is disabled, thereby causing the MPC 106 bridge to treat the memory write cycle as a memory select error and capture the memory address and enable the associated PowerPC processor to read the captured address and program it into the second decoder.

5. A computer system according to claim 4, wherein access to the local memory of a CPU by another processor of the system is enabled by the requesting processor asserting signal "ISA master" on the MPC 106 bridge of that CPU and arranging that the associated PCI-PCI bridge is programmed to the same address range as the second decoder of the respective MPC 106 bridge so that only memory cycles falling within the address range of a particular MPC 106 bridge are passed to that bridge by the associated PCI-PCI bridge.

* * * * *